(12) United States Patent
Chanez et al.

(10) Patent No.: US 7,600,384 B2
(45) Date of Patent: Oct. 13, 2009

(54) GAS EXHAUST NOZZLE FOR A BYPASS TURBOMACHINE HAVING AN EXHAUST OR THROAT SECTION THAT CAN BE VARIED BY MOVING THE SECONDARY COWL

(75) Inventors: Philippe Gerard Chanez, Paris (FR); Kamel Zeggai, Bondy (FR)

(73) Assignee: SNECMA, Paris (FR)

( * ) Notice: Subject to any disclaimer, the term of this patent is extended or adjusted under 35 U.S.C. 154(b) by 239 days.

(21) Appl. No.: 11/776,854

(22) Filed: Jul. 12, 2007

(65) Prior Publication Data

US 2008/0022690 A1    Jan. 31, 2008

(30) Foreign Application Priority Data

Jul. 26, 2006    (FR) .................................. 06 53132

(51) Int. Cl.
*F02K 1/00*    (2006.01)
(52) U.S. Cl. .................... 60/770; 60/771; 60/226.1; 239/265.39; 181/213
(58) Field of Classification Search ........... 60/226.1, 60/262, 770, 771; 239/265.19, 265.39; 181/213
See application file for complete search history.

(56) References Cited

U.S. PATENT DOCUMENTS

| | | | | |
|---|---|---|---|---|
| 2,794,319 A | * | 6/1957 | Stockdale | 60/766 |
| 2,796,731 A | * | 6/1957 | Rubbra et al. | 239/127.3 |
| 3,262,270 A | * | 7/1966 | Beavers | 60/226.2 |
| 3,581,841 A | | 6/1971 | Raynes | |
| 3,642,209 A | * | 2/1972 | Stahl | 239/265.19 |
| 3,797,785 A | | 3/1974 | Baerresen et al. | |
| 3,829,020 A | * | 8/1974 | Stearns | 239/265.13 |
| 4,162,040 A | * | 7/1979 | Carey | 239/265.33 |
| 4,383,407 A | * | 5/1983 | Inman | 60/771 |
| 4,525,999 A | * | 7/1985 | Inman | 60/407 |
| 4,922,713 A | * | 5/1990 | Barbarin et al. | 60/226.2 |
| 4,994,660 A | * | 2/1991 | Hauer | 239/265.41 |
| 5,039,014 A | * | 8/1991 | Lippmeier | 239/265.39 |
| 5,054,285 A | * | 10/1991 | Geidel et al. | 60/226.2 |
| 5,655,360 A | * | 8/1997 | Butler | 60/226.2 |

(Continued)

FOREIGN PATENT DOCUMENTS

EP    0 780 562 A1    6/1997

(Continued)

*Primary Examiner*—William H Rodríguez
(74) *Attorney, Agent, or Firm*—Oblon, Spivak, McClelland, Maier & Neustadt, L.L.P.

(57) ABSTRACT

The invention relates to an exhaust nozzle for a bypass turbomachine, the nozzle comprising a central body, a primary cowl surrounding the central body to define a primary channel, and a secondary cowl surrounding the primary cowl to define a secondary annular channel, the secondary cowl comprising a stationary portion and a movable portion disposed to extend the stationary portion and capable of moving longitudinally upstream and downstream relative to the stationary portion and relative to the primary cowl so as to vary the exhaust section and/or the throat section of the nozzle, the stationary portion of the secondary cowl presenting a plurality of spaced-apart repetitive patterns disposed extending its trailing edge, and the movable portion of the secondary cowl including in its outside surface a plurality of indentations of shapes complementary to the patterns of the stationary portion.

4 Claims, 3 Drawing Sheets

U.S. PATENT DOCUMENTS

| | | |
|---|---|---|
| 5,778,659 A | 7/1998 | Duesler et al. |
| 5,806,302 A * | 9/1998 | Cariola et al. .................. 60/204 |
| 5,996,937 A * | 12/1999 | Gonidec et al. ......... 244/110 B |
| 6,318,070 B1 * | 11/2001 | Rey et al. ................... 60/226.3 |
| 6,360,528 B1 * | 3/2002 | Brausch et al. ............... 60/262 |
| 6,895,742 B2 * | 5/2005 | Lair et al. .................. 60/226.2 |
| 6,966,175 B2 * | 11/2005 | Lair .......................... 60/226.1 |
| 6,968,675 B2 * | 11/2005 | Ramlaoui et al. ........... 60/226.2 |
| 6,983,602 B2 * | 1/2006 | Senile ......................... 60/771 |
| 7,000,378 B2 * | 2/2006 | Birch et al. ................. 60/226.1 |
| 7,010,905 B2 * | 3/2006 | Lair .......................... 60/226.1 |
| 7,174,704 B2 * | 2/2007 | Renggli ....................... 60/204 |
| 2001/0010148 A1* | 8/2001 | Michel et al. .............. 60/226.1 |
| 2006/0016171 A1* | 1/2006 | Renggli ....................... 60/204 |

FOREIGN PATENT DOCUMENTS

| | | |
|---|---|---|
| GB | 2 372 779 A | 9/2002 |

* cited by examiner

GAS EXHAUST NOZZLE FOR A BYPASS TURBOMACHINE HAVING AN EXHAUST OR THROAT SECTION THAT CAN BE VARIED BY MOVING THE SECONDARY COWL

BACKGROUND OF THE INVENTION

The present invention relates to the general field of gas exhaust nozzles for bypass turbomachines, and more particularly to a turbomachine nozzle having an exhaust or throat section that is variable as a function of operating speed.

A bypass turbomachine nozzle typically comprises an annular central body centered on a longitudinal axis of the nozzle, an annular primary cowl coaxially surrounding the central body to co-operate therewith to define a primary annular channel, and an annular secondary cowl coaxially surrounding the primary cowl to co-operate therewith to define a secondary annular channel coaxial about the primary channel.

The term "nozzle throat section" is used to designate the cross-section of the secondary channel that is the smallest along the entire length of the nozzle. The term "nozzle exhaust section" is used to designate the cross-section of the secondary channel that is the furthest downstream.

It is known that by varying the exhaust section or the throat section of the nozzle of a turbomachine, it is possible to control the rate of flow through its fan so as to place the fan under operating conditions that correspond to optimum efficiency, at any speed of the turbomachine. The use of exhaust nozzles of geometrically variable section is thus common practice in military applications. The techniques used generally have recourse to flaps disposed to extend the downstream end of the nozzle and capable of being steered so as to reduce or increase the exhaust section or the throat section of the nozzle.

Unfortunately, those techniques are difficult to adapt to the nozzles of civilian turbomachines. This is due in particular to constraints associated with how the nacelle is installed relative to the wing of the airplane, to ground clearance, and to the thicknesses and the shapes of the trailing edges of the nacelle. In addition, such variable section nozzles are relatively expensive to fabricate.

Thus, the nozzles used in civilian applications are generally of exhaust or throat section that is geometrically fixed and optimized for cruising flight, since that represents the major fraction of the mission of an airplane. As a result, the fixed section nozzles operate suboptimally when the turbomachine is running fast (corresponding to takeoff and while the airplane is climbing), and while the turbomachine is running slowly (corresponding to descent, to the approach stage, and to the airplane idling in flight).

OBJECT AND SUMMARY OF THE INVENTION

The main object of the present invention is thus to mitigate such drawbacks by proposing a gas exhaust nozzle for a bypass turbomachine that presents an exhaust or throat section that is geometrically variable as a function of the operating speed of the turbomachine.

In accordance with the invention, this object is achieved by a nozzle in which the secondary cowl is made up of a stationary portion and a movable portion disposed to extend the stationary portion longitudinally and capable of moving longitudinally upstream and downstream relative to the stationary portion and relative to the primary cowl so as to vary the exhaust section and/or the throat section of the nozzle, the stationary portion of the secondary cowl presenting a plurality of repetitive patterns that are spaced apart circumferentially and that are disposed to extend its trailing edge longitudinally, and the moving portion of the secondary cowl has, in its outside surface, a plurality of indentations of shapes complementary to the patterns of the stationary portion.

By moving the movable portion of the primary cowl longitudinally upstream or downstream, it is possible to enlarge or reduce the exhaust section or the throat section of the nozzle in continuous and accurate manner depending on the operating speed of the turbomachine. This system thus presents numerous advantages, in particular those of being robust, accurate, compatible with existing nozzles, adding relatively little weight, and being easy to mount on bypass turbomachines used in civilian applications. In particular, it can easily be fitted to nozzles where thrust reversal is obtained by moving the secondary cowl in translation.

The presence of patterns disposed extending the trailing edge of the stationary portion of the secondary cowl serves firstly to reduce the parasitic drag produced by the "step" that inevitably appears between the stationary and moving portions of the secondary cowl during displacement of the movable portion, and secondly to contribute to reducing sound emission in any of the positions of the movable portion of the secondary cowl.

In an advantageous disposition of the invention, the moving portion of the secondary cowl presents an inside diameter that decreases going downstream, and the primary cowl presents, in its portion facing the movable portion of the secondary cowl, a downstream annular portion having an outside diameter that decreases going downstream, the moving portion of the secondary cowl being movable longitudinally between two extreme positions; a downstream extreme position corresponding to a nominal exhaust section or throat section, and an upstream extreme position corresponding to an exhaust section or throat section reduced to a minimum.

The secondary cowl of the nozzle may include at least one actuator for moving the movable portion of said cowl longitudinally.

The invention also provides a turbomachine including a nozzle as defined above.

BRIEF DESCRIPTION OF THE DRAWINGS

Other characteristics and advantages of the present invention appear from the following description given with reference to the accompanying drawings that show an embodiment having no limiting character. In the figures.

DETAILED DESCRIPTION OF AN EMBODIMENT

Figure 1:
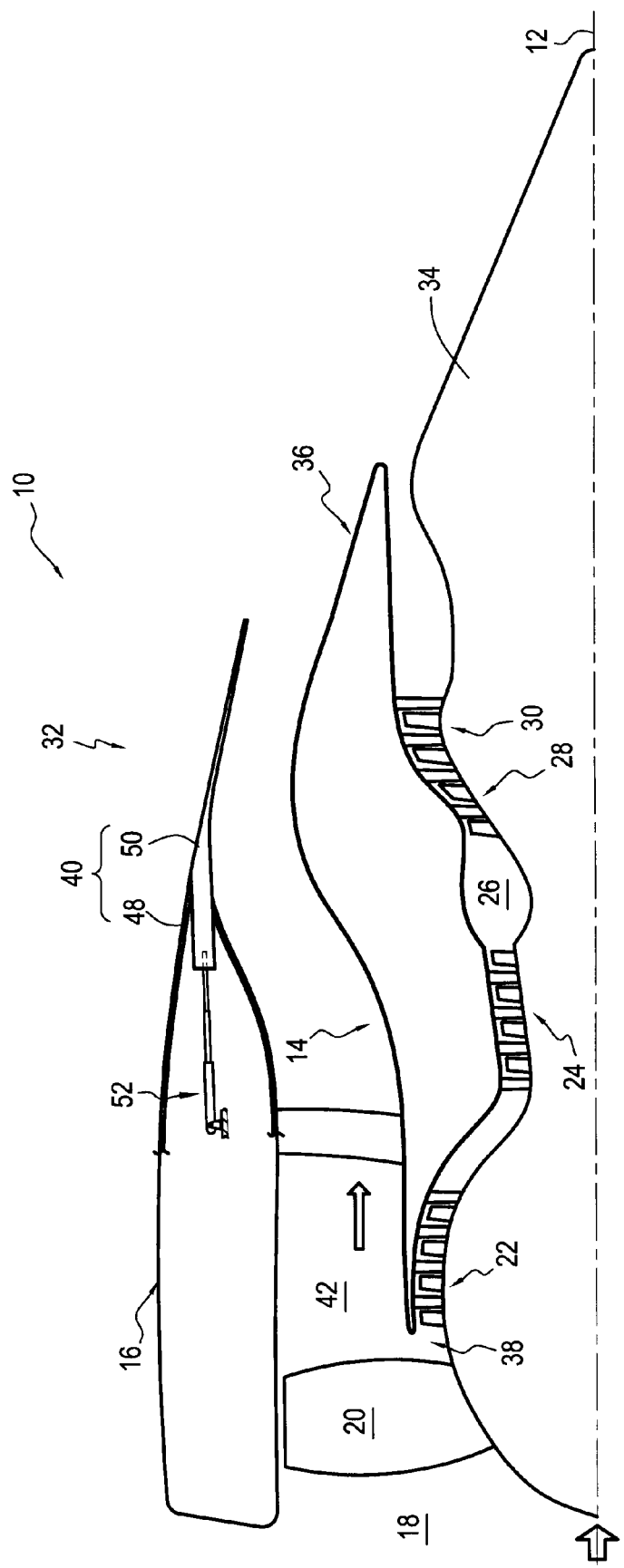
FIG. 1 is a highly diagrammatic longitudinal half-section view of a turbomachine fitted with a nozzle of the invention.

FIG. 1 is a highly diagrammatic longitudinal section view showing half of a bypass turbomachine 10 fitted with a nozzle of the invention. The turbomachine has a longitudinal axis 12 and comprises a gas turbine engine 14 and an annular nacelle 16 centered on the axis 12 and disposed concentrically around the engine.

From upstream to downstream in the flow direction of a stream of air passing through the turbomachine, the engine 14 comprises: an air inlet 18; a fan 20; a low-pressure compressor 22; a high-pressure compressor 24; a combustion chamber 26; a high-pressure turbine 28; and a low-pressure turbine 30, each of these elements being disposed along the longitudinal axis 12.

The nozzle 32 for exhausting the gas produced by such a turbomachine comprises an annular central body 34 centered on the longitudinal axis 12 of the turbomachine, an annular primary cowl 36 coaxially surrounding the central body to co-operate therewith to define a primary annular channel 38, and an annular secondary cowl 40 coaxially surrounding the primary cowl to co-operate therewith to define a secondary annular channel 42 coaxial with the primary channel (in the embodiment of FIG. 1, the nacelle 16 of the turbomachine and the secondary cowl 40 of the nozzle constitute a single part).

It can be seen in the example of FIG. 1 that the central body 34 of the nozzle 32 is of the external type, i.e. the central body extends longitudinally beyond the trailing edge of the primary cowl 36.

Nevertheless, the invention can also apply to a separate stream nozzle of the internal type in which the trailing edge of the primary cowl extends longitudinally beyond the central body so as to cover it completely.

The path followed by air through the turbomachine is as follows. Air is admitted into the turbomachine via the air inlet 18. Downstream from the fan 20, the stream of air splits into a fraction that flows in the secondary channel 42, and another fraction that follows the primary channel 38. In the primary channel 38, the air is compressed by the compressors 22 and 24, mixed with fuel in the combustion chamber 26, and burnt. The gas that results from this combustion drives the high-pressure turbine 28 and the low-pressure turbine 30 prior to being exhausted.

Figure 2:
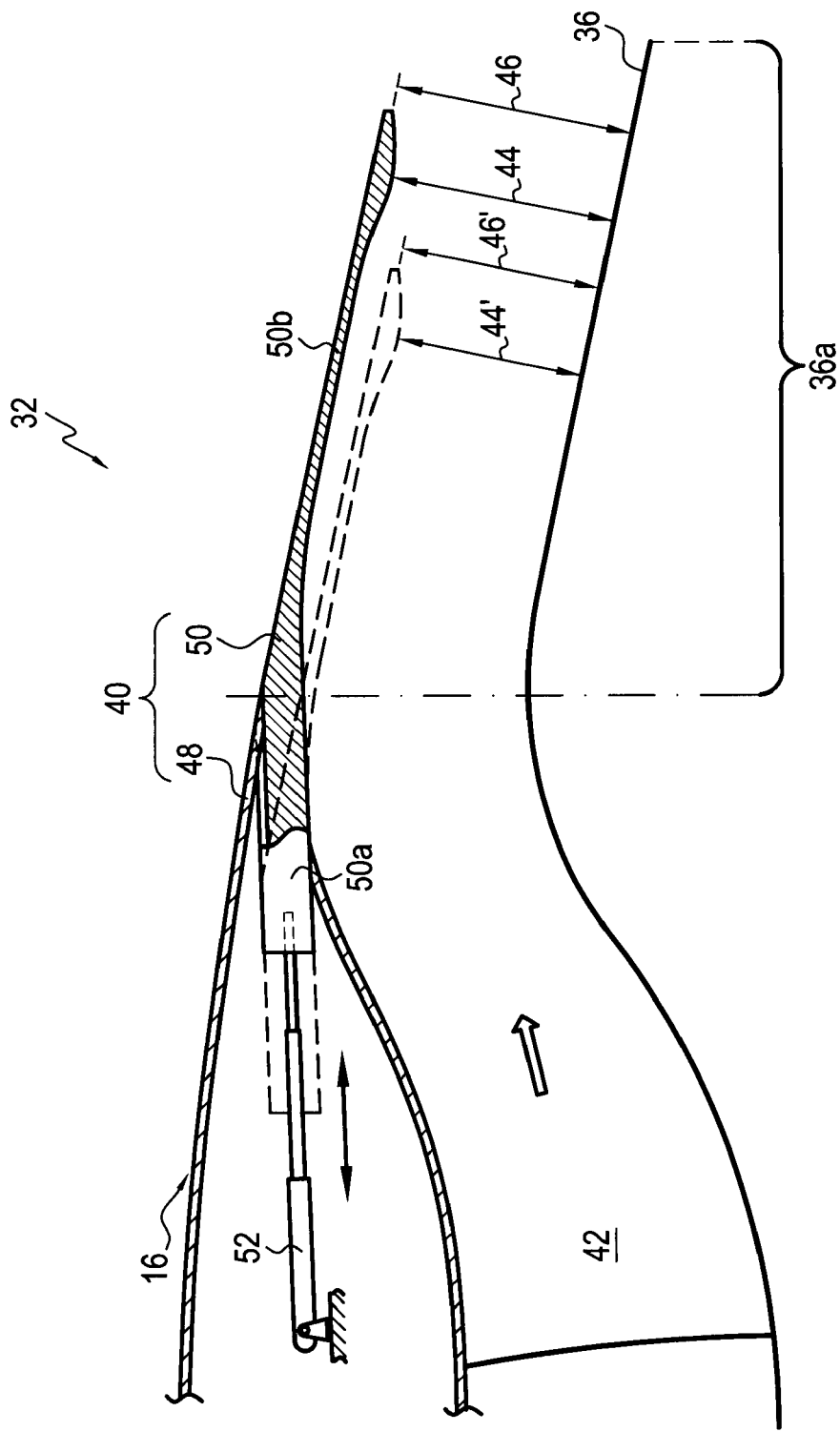
FIG. 2 is an enlargement of a portion of FIG. 1.

As shown in FIG. 2, the gas exhaust nozzle 32 presents a throat section 44 that corresponds to the smallest cross-section of the secondary channel 42 along the entire length of the nozzle, and an exhaust section 46 that corresponds to the cross-section of the secondary channel at the downstream end of the nozzle.

In the invention, the secondary cowl 40 of the nozzle comprises a stationary portion 48 and a movable portion 50 that is disposed to extend the stationary portion longitudinally and that can be moved longitudinally upstream or downstream relative to the stationary portion 48 and relative to the primary cowl 36 so as to vary the throat section 44 and/or the exhaust section 46 of the nozzle.

More precisely, the stationary portion 48 of the secondary cowl is annular in shape having an inside diameter that decreases going downstream. The movable portion 50 possesses a substantially cylindrical upstream portion 50a disposed inside the stationary portion 48 of the secondary cowl so as to be concentric therewith, and it is extended downstream by a downstream portion 50b. The downstream portion presents an inside diameter that decreases going downstream in line with the decreasing diameter of the stationary portion 48 of the secondary cowl. Thus, when the movable portion 50 of the secondary cowl is situated in the position shown in continuous lines in FIG. 2, its own downstream portion 50b extends the stationary portion 48 and reproduces the general shape of the nacelle 16 of the turbomachine. Furthermore, in its portion facing the moving portion 50 of the secondary cowl 40, the primary cowl 36 presents an annular portion 36a of outside diameter that decreases going downstream.

With such an arrangement, when the moving portion 50 of the secondary cowl 40 is situated in the position shown in continuous lines in FIG. 2 (i.e. in its downstream extreme position), the throat section 44 and the exhaust section 46 of the nozzle 32 are in a "nominal" position, e.g. a position that is optimized for cruising flight. As mentioned above, in this position, the stationary and movable portions of the secondary cowl are disposed relative to each other in such a manner as to reproduce the general shape of the nacelle 16 of the turbomachine, thereby limiting the harmful effects that can be produced by subdividing the secondary cowl into two portions.

When the moving portion 50 of the secondary cowl 40 is moved longitudinally upstream into the position shown in dashed lines in FIG. 2 (i.e. towards an upstream extreme position), the moving portion 50 of the cowl is retracted under the stationary portion 48, and both the throat section 44' and the exhaust section 46' of the nozzle are in positions that are minimized relative to their respective positions shown in continuous lines in FIG. 2. This retracted position may be optimized for example for the fast and slow speeds of operation of the turbomachine. By way of example, between the two extreme positions of the movable portion 50 of the secondary cowl 40, it is possible to obtain a reduction in the exhaust section 46 of the nozzle that is about 15%.

The movable portion 50 of the secondary cowl can be moved longitudinally by means of at least one actuator 52 secured to the stationary portion 48 of the secondary cowl, connected to the moving portion, and controlled by a suitable control device (not shown in the figures) enabling the movable portion to be moved continuously between its two extreme positions. Naturally, any other equivalent means could be used for moving the movable segment relative to the remainder of the primary cowl.

During upstream movement of the moving portion 50, a "step" (or perpendicular discontinuity in the flow along the secondary channel) inevitably occurs between the stationary and movable portions of the secondary cowl of the nozzle. Such a non-uniformity in the general shape of the nacelle of the turbomachine has the effect of generating a high level of drag in its wake, which is particularly harmful for the aerodynamic performance of the nacelle.

Still according to the invention, in order to attenuate the parasitic drag produced by such a "step", the stationary portion 48 of the secondary cowl 40 presents a plurality of repeated patterns 54 that are spaced apart circumferentially and that extend its trailing edge longitudinally, while the movable portion 50 of the secondary cowl has a plurality of indentations 56 in its outside surface that are complementary in shape to the patterns 54 of the stationary portion.

Figure 3:
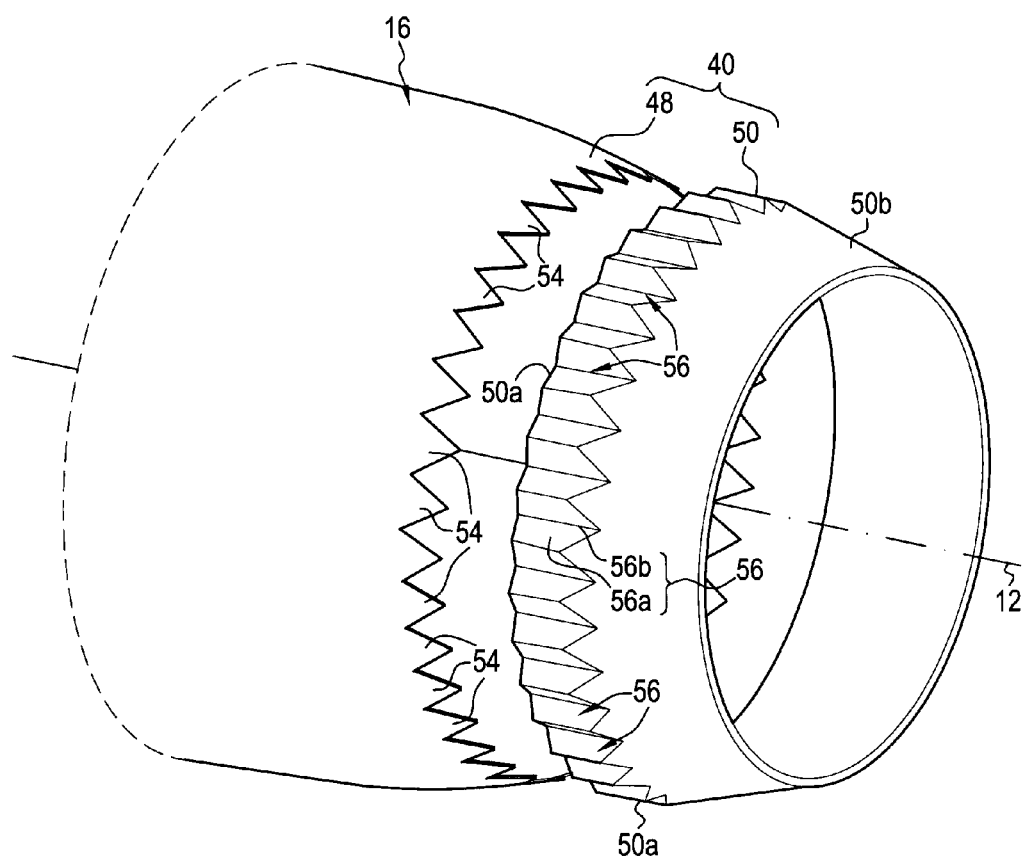
FIG. 3 is a exploded fragmentary view in perspective showing the nozzle of FIG. 1.

In the embodiment of FIG. 3, the stationary portion 48 of the secondary cowl possesses a plurality of patterns 54 that are triangular in shape. Thus, the flow along the secondary cowl becomes turbulent around the tips of the triangular patterns 54 while retaining a component along the longitudinal axis 12 of the turbomachine, thereby reducing drag. In addition, the triangular patterns can attenuate the emission of noise by reducing shear on exhaust.

Naturally, any other shape of pattern could be envisaged (rectangular, square, curvilinear, etc.), providing it reduces the parasitic drag produced by the discontinuity in the general shape of the nacelle.

With a triangular shape, the moving portion 50 of the secondary cowl possesses an indentation 56a in its outside surface close to its upstream portion 50a, which indentation presents a cross-section that is V-shaped and outwardly open, and extends into the downstream portion 50b by a notch 56b of triangular shape.

It should be observed that the presence of such repeated patterns in the portion where the nacelle is connected to the wing of the airplane via a pylon can have a negative influence on the drag of the installation. It is possible that the sudden increase in section between the wing of the airplane and the nacelle produces a shock, or increases the intensity of an already-existing shock. In order to prevent such a phenomenon, a zone can be provided that does not have any repetitive patterns in this portion where the nacelle is connected to the pylon.

What is claimed is:

1. A gas exhaust nozzle for a bypass turbomachine, the nozzle comprising an annular central body centered on a longitudinal axis of the nozzle, an annular primary cowl surrounding the central body coaxially so as to co-operate therewith to define a primary annular channel, and an annular secondary cowl surrounding the primary cowl coaxially so as to co-operate therewith to define a secondary annular channel coaxial with the primary channel, wherein the secondary cowl comprises a stationary portion and a movable portion extending the stationary portion longitudinally and capable of moving longitudinally upstream and downstream relative to the stationary portion and relative to the primary cowl so as to vary the exhaust section and/or the throat section of the nozzle, the stationary portion of the secondary cowl presenting a plurality of repetitive patterns circumferentially spaced apart and longitudinally extending its trailing edge, and the moving portion of the secondary cowl having in its outside surface a plurality of indentations of shapes complementary to the patterns of the stationary portion.

2. A nozzle according to claim 1, in which the moving portion of the secondary cowl presents an inside diameter that decreases going downstream, and the primary cowl presents in its portion facing the movable portion of the secondary cowl, a downstream annular portion having an outside diameter that decreases going downstream, the moving portion of the secondary cowl being movable longitudinally between two extreme positions; a downstream extreme position corresponding to a nominal exhaust section or throat section, and an upstream extreme position corresponding to an exhaust section or throat section reduced to a minimum.

3. A nozzle according to claim 1, in which the secondary cowl includes at least one actuator for moving the movable portion of said cowl longitudinally.

4. A bypass turbomachine, including a gas exhaust nozzle according to claim 1.

* * * * *